United States Patent
Rogers

(10) Patent No.: US 9,851,590 B2
(45) Date of Patent: Dec. 26, 2017

(54) PRODUCT DISPLAY SYSTEM AND PRODUCT DISPLAY METHOD

(71) Applicant: R.J. Reynolds Tobacco Company, Winston-Salem, NC (US)

(72) Inventor: James William Rogers, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 257 days.

(21) Appl. No.: 14/725,725

(22) Filed: May 29, 2015

(65) Prior Publication Data

US 2016/0349543 A1 Dec. 1, 2016

(51) Int. Cl.
| | |
|---|---|
| *G06K 15/00* | (2006.01) |
| *G02F 1/01* | (2006.01) |
| *G02F 1/00* | (2006.01) |
| *G02F 1/23* | (2006.01) |
| *H05B 37/02* | (2006.01) |
| *H05B 33/08* | (2006.01) |
| *H02J 50/10* | (2016.01) |
| *G09F 23/06* | (2006.01) |

(Continued)

(52) U.S. Cl.
CPC .......... *G02F 1/0128* (2013.01); *G02F 1/0072* (2013.01); *G02F 1/23* (2013.01); *G09F 23/06* (2013.01); *H02J 50/10* (2016.02); *H05B 33/0854* (2013.01); *H05B 37/0227* (2013.01); *G09F 13/005* (2013.01); *G09F 13/20* (2013.01); *G09F 25/00* (2013.01); *G09F 27/005* (2013.01); *G09F 2023/0025* (2013.01); *G09F 2027/001* (2013.01); *G09F 2027/002* (2013.01)

(58) Field of Classification Search
CPC ... G06C 30/02; G06C 10/087; G08B 13/2434
USPC ........................................................ 235/383
See application file for complete search history.

(56) References Cited

U.S. PATENT DOCUMENTS

| 6,896,145 B2 | 5/2005 | Higgins et al. |
| 7,119,804 B2 | 10/2006 | Sweeney et al. |

(Continued)

FOREIGN PATENT DOCUMENTS

WO    WO 2015/022336    2/2015

OTHER PUBLICATIONS

Electric Film Light Harvesting Solutions; © 2014 ElectricFilm, LLC (12 pages) Website visited May 29, 2015 http://electricfilmpower.com/.

(Continued)

*Primary Examiner* — Jamara Franklin
(74) *Attorney, Agent, or Firm* — Womble Bond Dickinson (US) LLP

(57) ABSTRACT

Product display systems are provided. The product display systems may include a product display assembly and one or more products positioned in proximity to the product display assembly. The product display assembly may include a solar cell configured to receive light and output electrical current and a wireless power transmitter configured to receive the electrical current. The product may include a wireless power receiver that cooperates with the wireless power transmitter to produce current that powers an output mechanism. The output mechanism outputs a perceptible effect such as light or sound to attract consumer attention. A related method is also provided.

26 Claims, 8 Drawing Sheets

(51) Int. Cl.

| | |
|---|---|
| G09F 13/20 | (2006.01) |
| G09F 13/00 | (2006.01) |
| G09F 27/00 | (2006.01) |
| G09F 25/00 | (2006.01) |
| G09F 23/00 | (2006.01) |

(56) References Cited

U.S. PATENT DOCUMENTS

| | | |
|---|---|---|
| 7,356,952 B2 | 4/2008 | Sweeney et al. |
| 7,429,984 B2 | 9/2008 | Sweeney |
| 7,617,930 B2 | 11/2009 | Jones et al. |
| 7,624,918 B2 | 12/2009 | Sweeney et al. |
| 8,118,161 B2 | 2/2012 | Guerrera et al. |
| 2007/0165366 A1 | 7/2007 | Sokola |
| 2009/0008275 A1 | 1/2009 | Ferrari et al. |
| 2009/0261114 A1 | 10/2009 | McGuire et al. |
| 2009/0284164 A1 | 11/2009 | Ray et al. |
| 2013/0334293 A1 | 12/2013 | Coatney et al. |
| 2015/0294398 A1* | 10/2015 | Khalid ............... G06Q 30/0631 705/26.7 |

OTHER PUBLICATIONS

Products/Opalux Inc.; Photonic Ink; © 2015 Opalux Inc. (5 pages) Website visited May 29, 2015 http://opalux.com/products/.

* cited by examiner

PRODUCT DISPLAY SYSTEM AND PRODUCT DISPLAY METHOD

FIELD OF THE DISCLOSURE

The present disclosure relates to product display systems and product display methods. The product display systems and methods may be employed in conjunction with products made or derived from tobacco, or that otherwise incorporate tobacco.

BACKGROUND OF THE DISCLOSURE

Various products are sold at retail stores. Often, stores carry a variety of types of products and brands thereof in order to attract a wider range of consumers and in order to encourage multiple purchases from each consumer. For example, convenience stores, supermarkets, and other retail establishments often carry a large variety of food, beverages, and other products. By way of further example, such stores also often carry tobacco products.

As a result of numerous types and/or brands of products being sold at the same location, conventional methods employed to gain consumer attention may no longer work in a satisfactory manner to draw consumer attention to a product. Thereby, product manufacturers, distributors, and retailers are searching for improved methods and mechanisms for gaining a consumer's attention in retail environments. Example marketing techniques and associated devices are disclosed in U.S. Pat. No. 6,896,145 to Higgins et al., U.S. Pat. No. 7,119,804 to Sweeney et al., U.S. Pat. No. 7,356,952 to Sweeney et al., U.S. Pat. No. 7,429,984 to Sweeney, and U.S. Pat. No. 7,624,918 to Sweeney et al., and PCT Pat. Appl. Pub. WO 2015/022336 to Hayes et al., which are incorporated herein by reference in their entireties.

However, it may be desirable to provide improved product display systems and methods.

BRIEF SUMMARY OF THE DISCLOSURE

The present disclosure provides apparatuses, systems, and methods for displaying products. The apparatuses, systems, and methods may be employed in retail environments to display products for sale and may include features configured to gain consumer attention.

In one aspect a product display system is provided. The product display system may include a product display assembly. The product display assembly may include a power supply configured to produce a first electrical current. The power supply may include a wireless power transmitter configured to receive the first electrical current. The product display system may additionally include a product positioned in proximity to the product display assembly. The product may include a wireless power receiver configured to cooperate with the wireless power transmitter to produce a second electrical current and an output mechanism configured to receive the second electrical current from the wireless power receiver and output a perceptible effect in response thereto.

In some embodiments the product may comprise a packaged tobacco product. The output mechanism may include a light emitter configured to output light. The product may include a logo, and the light emitter may be positioned at the logo.

In some embodiments the output mechanism may include an electronic ink configured to display one or more of a text and a graphic. The electronic ink may be configured to display a plurality of colors. The electronic ink may be configured to display animation.

In some embodiments the product display system may further include a sensor configured to detect a human presence. The output mechanism may be configured to activate in response to detection of the human presence by the sensor. The sensor may be configured to detect one or more of a motion and a sound. In some embodiments the product display system may further include a current storage mechanism configured to store the first electrical current and output the first electrical current to the wireless power transmitter in response to detection of the human presence by the sensor. The power supply may include a light-to-power conversion mechanism configured to receive light and output the first electrical current.

In an additional aspect a product display method is provided. The product display method may include positioning a product in proximity to a product display assembly. Further, the method may include outputting a first electrical current to a wireless power transmitter of the product display assembly. The method may further include producing a second electrical current with a wireless power receiver of the product configured to cooperate with the wireless power transmitter. Additionally, the method may include receiving the second electrical current and outputting a perceptible effect in response thereto with an output mechanism of the product.

In some embodiments positioning the product in proximity to the product display assembly may include positioning a packaged tobacco product in the product display assembly. Outputting the perceptible effect may include outputting light. Outputting light may include outputting light at a logo on the product.

In some embodiments outputting the perceptible effect may include displaying one or more of a text and a graphic. Displaying one or more of the text and the graphic may include displaying a plurality of colors. Displaying one or more of the text and the graphic may include displaying animation.

In some embodiments the method may further include detecting a human presence. Outputting the first electrical current to the wireless power transmitter may include outputting the first electrical current to the wireless power transmitter in response to detection of the human presence. Detecting the human presence may include detecting one or more of a motion and a sound. The method may additionally include storing the first electrical current. Outputting the first electrical current to the wireless power transmitter may include outputting the first electrical current to the wireless power transmitter in response to detection of the human presence by the sensor. Outputting the first electrical current to the wireless power transmitter of the product display assembly may include receiving light and outputting the first electrical current in response thereto with a light-to-power conversion mechanism of the product display assembly.

In an additional aspect, a product display system is provided. The product display system may include a product display assembly including a power supply. The product display system may additionally include a packaged tobacco product positioned in proximity to the product display assembly. The packaged tobacco product may include an output mechanism powered by the power supply and configured to output a perceptible effect.

In some embodiments the power supply may include a wireless power transmitter. The packaged tobacco product may further include a wireless power receiver configured to cooperate with the wireless power transmitter to power the output mechanism. The product may include a logo. The output mechanism may include a light emitter positioned at the logo and configured to output light. The power supply may include a light-to-power conversion mechanism.

These and other features, aspects, and advantages of the disclosure will be apparent from a reading of the following detailed description together with the accompanying drawings, which are briefly described below.

BRIEF DESCRIPTION OF THE DRAWINGS

Figure 1:
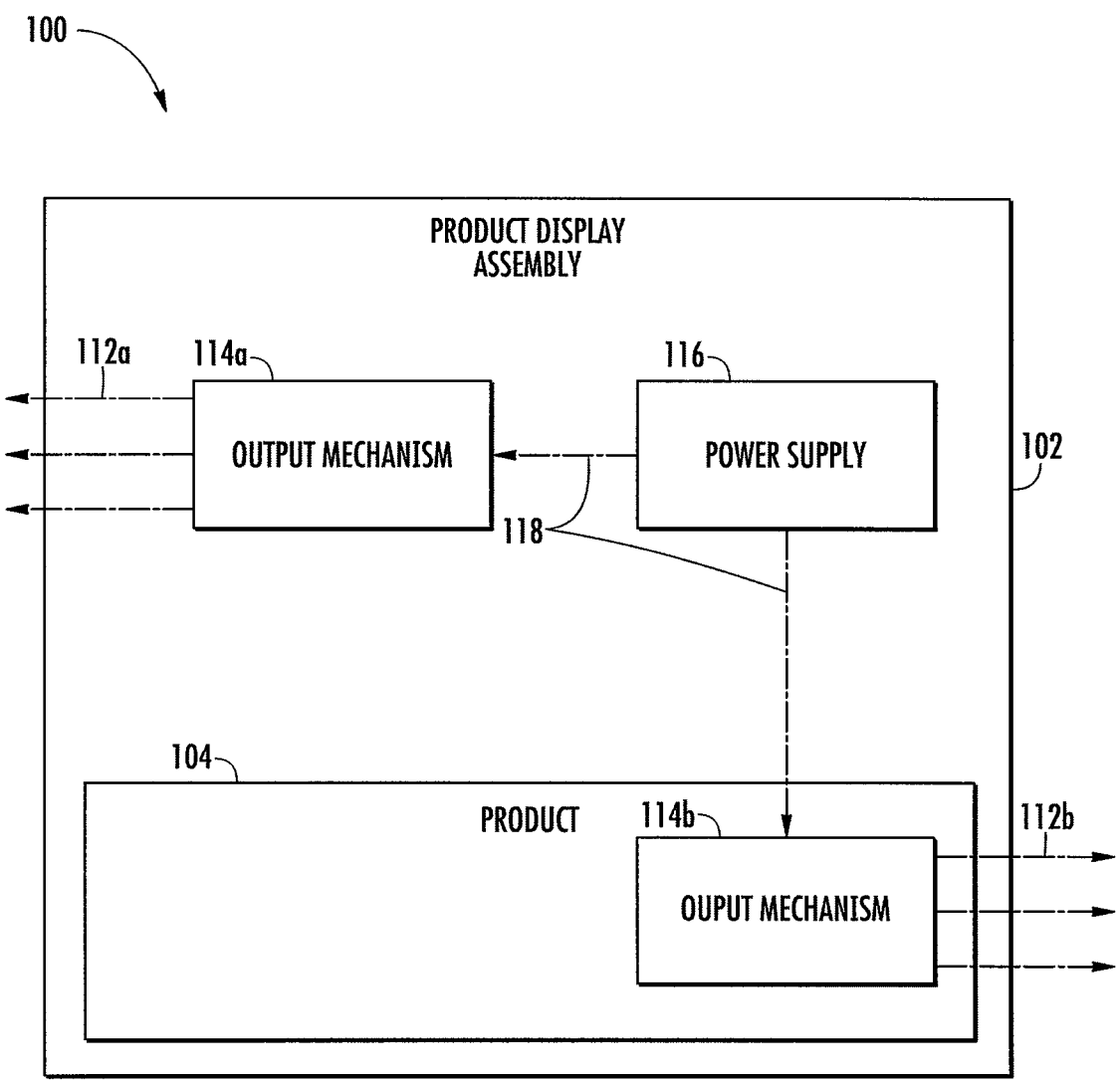
Figure 2:
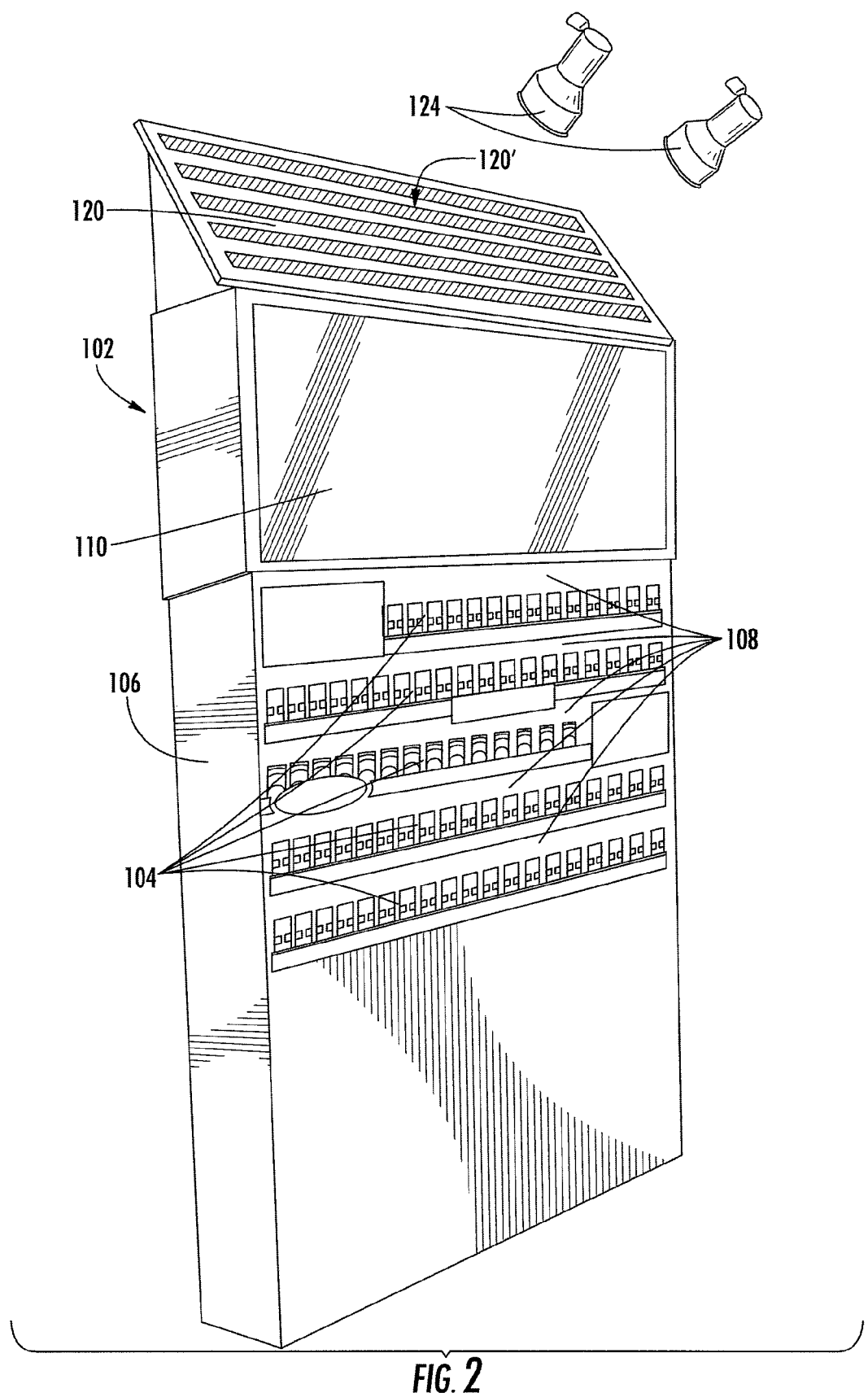
Figure 3:
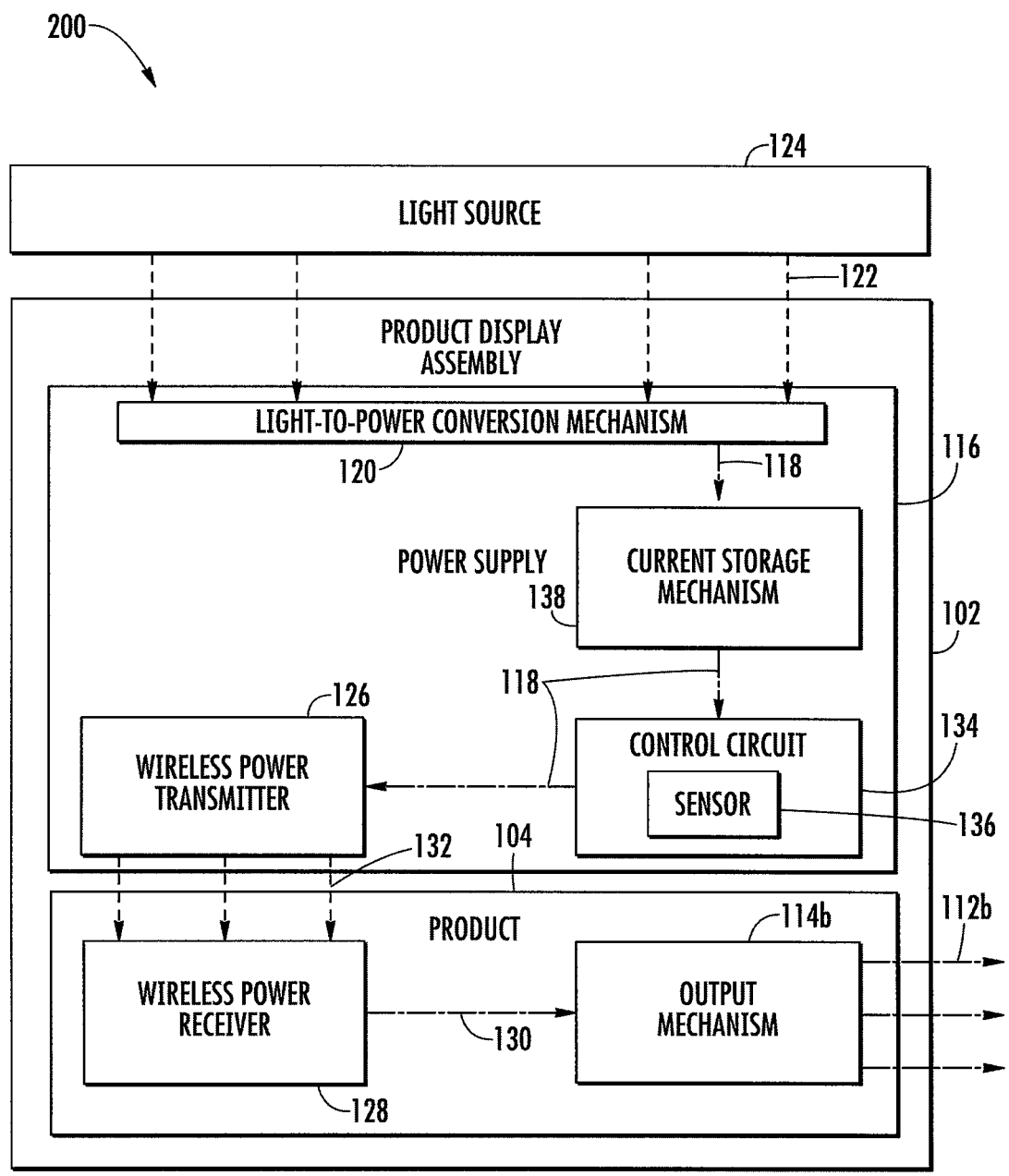
Figure 4:
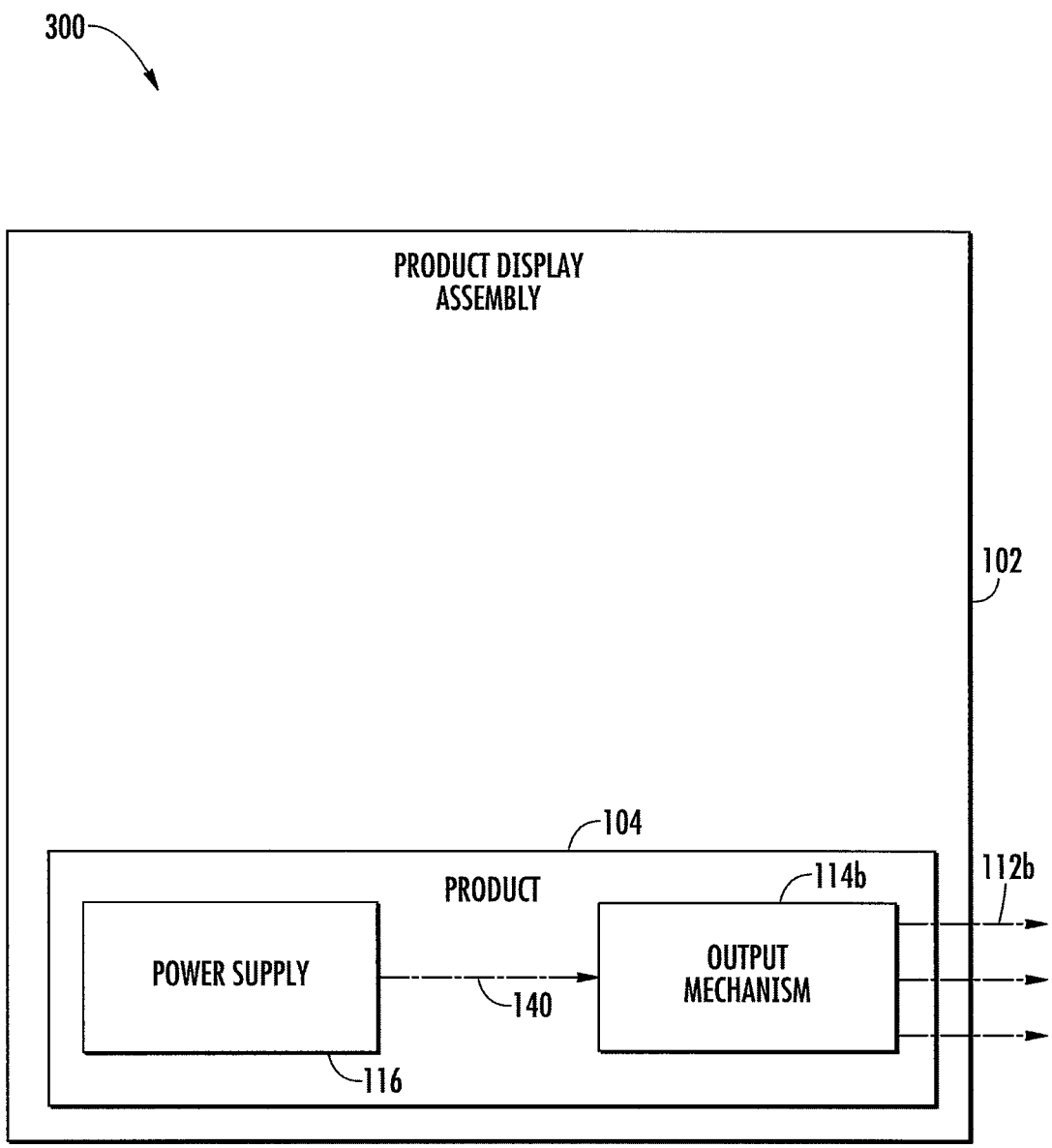
Figure 5:
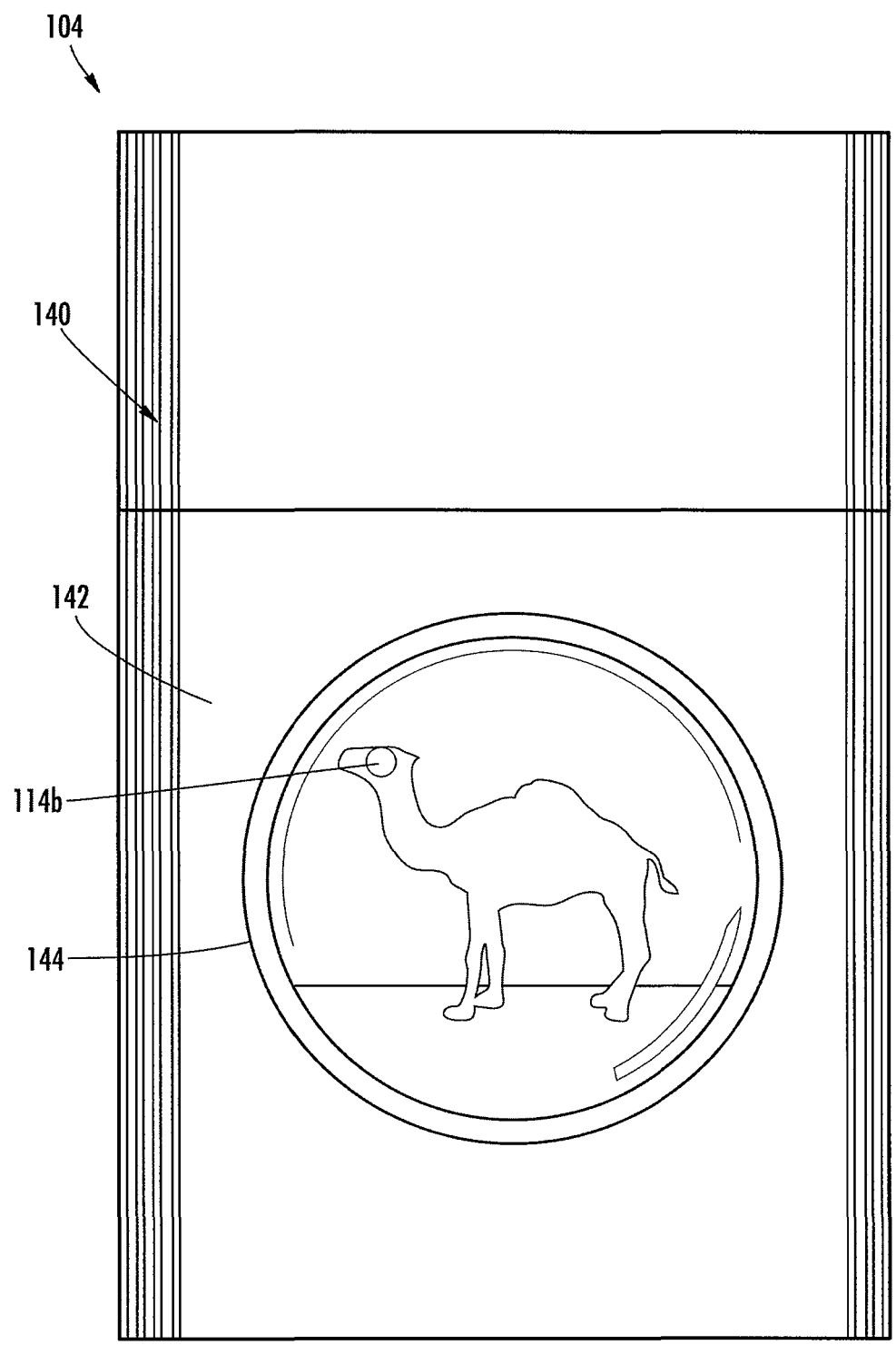
Figure 6:
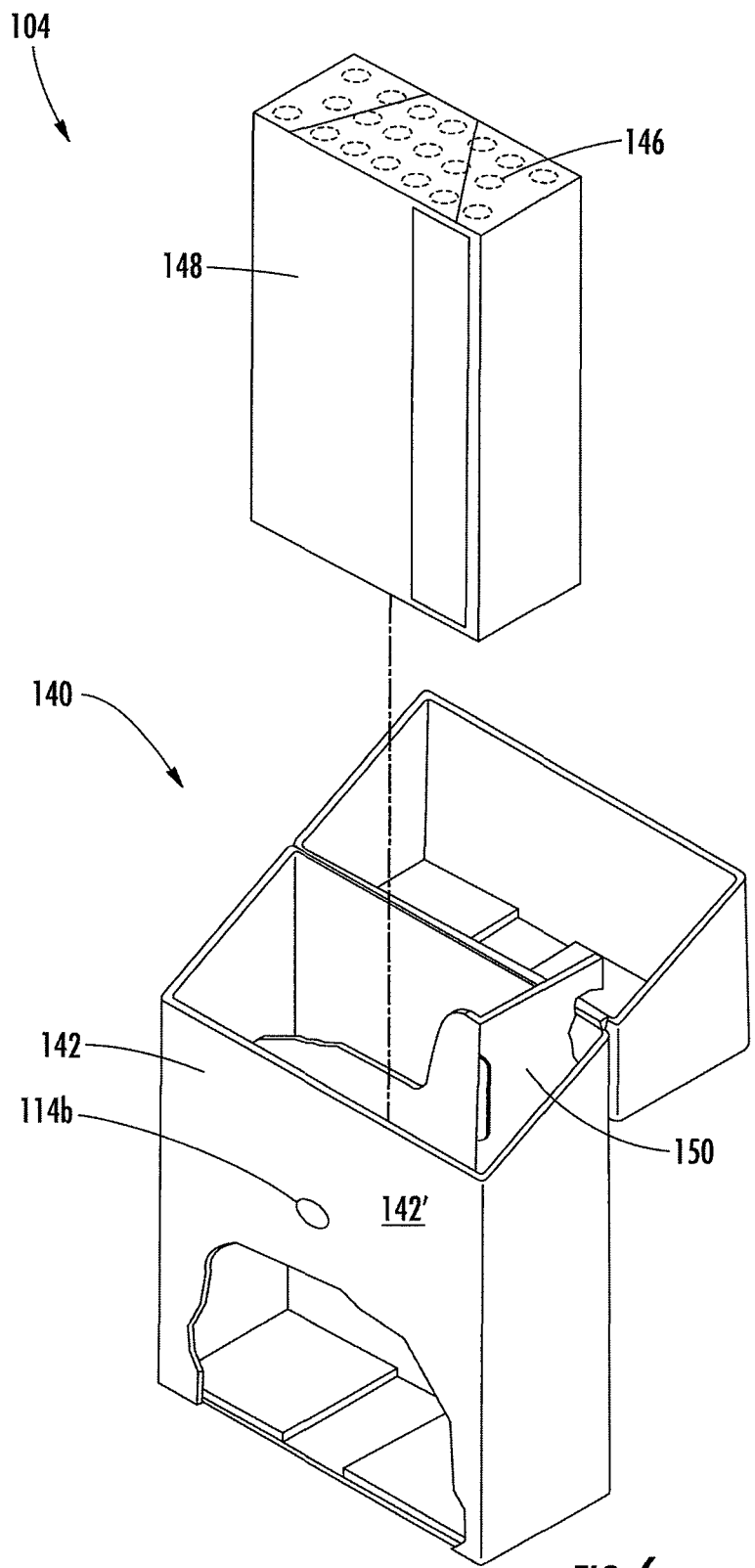
Figure 7:
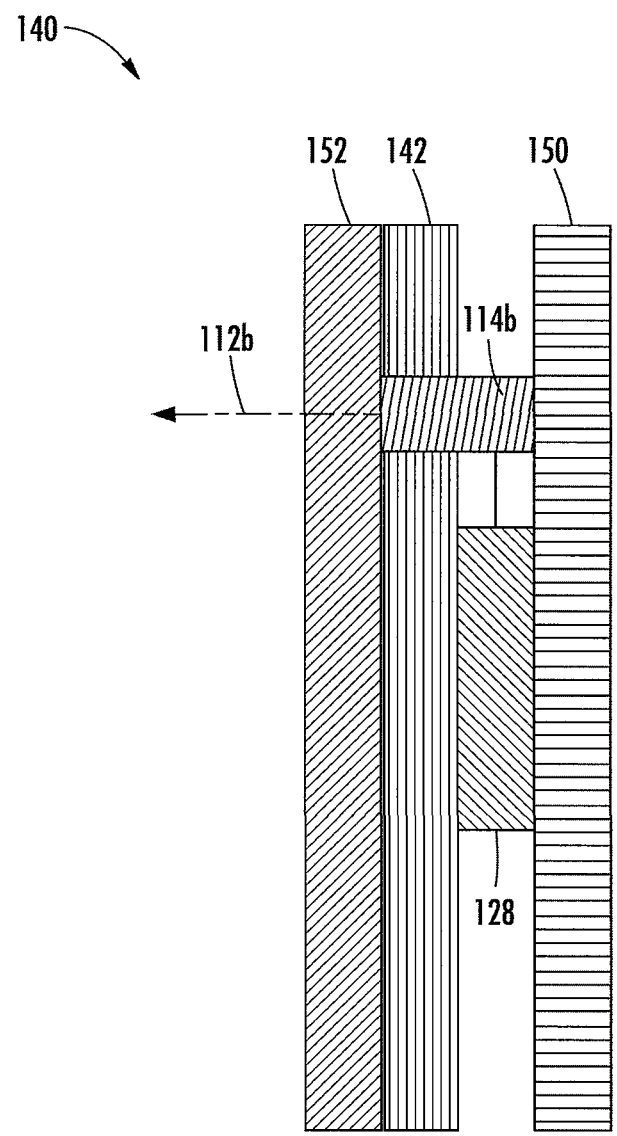
Figure 8:
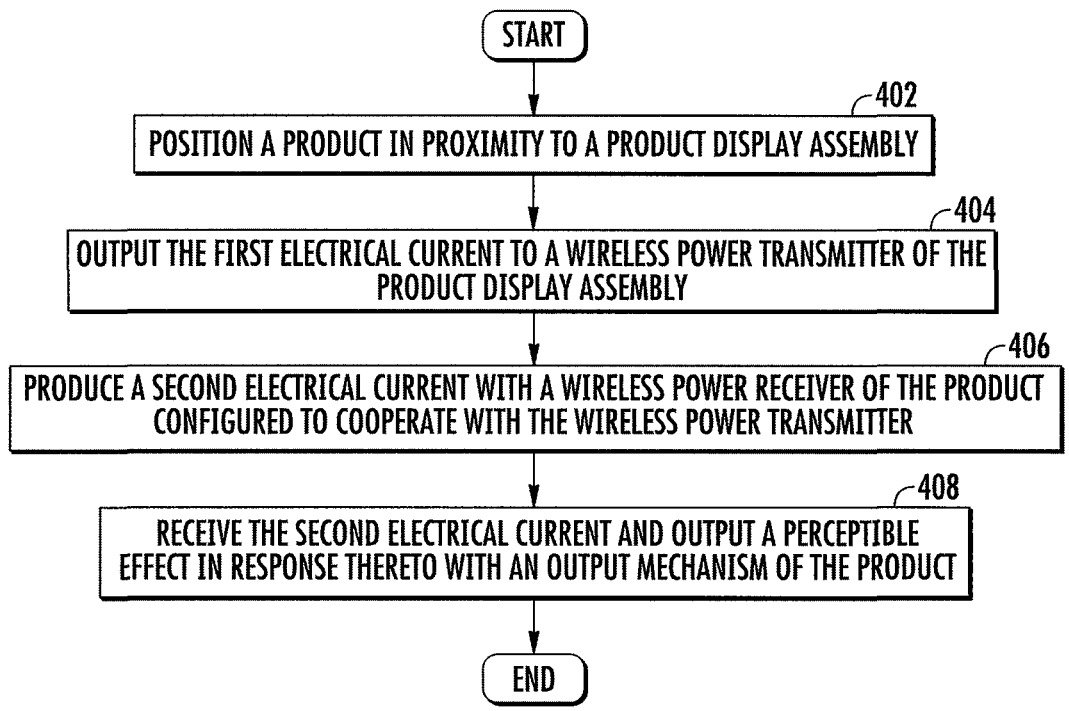

Having thus described the disclosure in general terms, reference will now be made to the accompanying drawings, which are not necessarily drawn to scale, and wherein:

FIG. 1 schematically illustrates a product display system including a product display assembly and a product, wherein output mechanisms are directly powered by a power supply according to an example embodiment of the present disclosure;

FIG. 2 illustrates a perspective view of a product display assembly of the product display system of FIG. 1 according to an example embodiment of the present disclosure;

FIG. 3 schematically illustrates a product display system including a product display assembly and a product, wherein an output mechanism is wirelessly powered by a power supply according to an example embodiment of the present disclosure;

FIG. 4 schematically illustrates a product display system including a product display assembly and a product, wherein an output mechanism is powered by energy harvesting according to an example embodiment of the present disclosure;

FIG. 5 illustrates a front view of a product comprising a packaged tobacco product according to an example embodiment of the present disclosure;

FIG. 6 illustrates an exploded view of the product of FIG. 5;

FIG. 7 schematically illustrates a partial sectional view through a package of the product of FIG. 5 according to an example embodiment of the present disclosure; and FIG. 8 schematically illustrates a product display method according to an example embodiment of the present disclosure.

DETAILED DESCRIPTION OF THE DISCLOSURE

The present disclosure now will be described more fully hereinafter with reference to certain preferred aspects. These aspects are provided so that this disclosure will be thorough and complete, and will fully convey the scope of the disclosure to those skilled in the art. Indeed, the disclosure may be embodied in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

Various products are sold in retail establishments. Such stores often carry a wide variety of types and brands of products. Thereby, product display mechanisms may play an important role in dictating sales of the products associated therewith. In this regard, by way of example, U.S. patent application Ser. No. 14/274,245, filed May 9, 2014, and Ser. No. 14/700,636, filed Apr. 30, 2015, both to Stebbins et al. and each incorporated herein by reference in their entireties, disclose convertible packaging devices which may be employed to house one or more products during shipment, and display the products at a retail store upon conversion of the devices to a display configuration at the retail store. U.S. patent application Ser. No. 13/524,218 to Coatney et al., filed Jun. 15, 2012, discloses promotional packaging configured to hold first and second tobacco products, which may differ from one another, in first and second compartments, and is incorporated herein by reference in its entirety.

However, various other mechanisms and methods for displaying products may be desirable. In this regard, FIG. 1 schematically illustrates a product display system 100 according to an example embodiment of the present disclosure. The product display system 100 may include a product display assembly 102 and at least one product 104. The product display assembly 102 may be configured to support, hold, contain, or otherwise position the one or more products 104. Thereby, in some embodiments the products 104 may be at least partially exposed. Thus, the product display assembly 102 may support the products 104 such that the products are externally viewable, accessible, and removable therefrom. In this regard, the products 104 may be offered for sale from the product display assembly 102.

FIG. 2 illustrates a product display assembly 102 according to an example embodiment of the present disclosure which may be included in any of the product display systems disclosed herein. As illustrated, the product display assembly 102 may comprise a rack 106. The rack 106 may include one or more shelves 108. The shelves 108 may be configured to support the products 104 such that the products are at least partially exposed, and thereby visible to a consumer and accessible for removal therefrom. As further illustrated, in some embodiments the rack 106 may include one or more panels 110 configured to display brand names or other product identifiers, images, pricing information, or various other such information and/or graphics. Such panels 110 may thereby assist in gaining consumer attention.

However, as described hereinafter, additional mechanisms and methods for gaining consumer attention may be employed. In this regard, as schematically illustrated in FIG. 1, the product display system 100 may be configured to output one or more perceptible effects 112a, 112b. The one or more perceptible effects 112a, 112b may be produced by one or more output mechanisms 114a, 114b. As illustrated, the product display assembly 102 may include an output mechanism 114a configured to output a perceptible effect 112a. Alternatively or additionally, one or more products 104 may include an output mechanism 114b configured to output a perceptible effect 112b.

In embodiments in which the product display assembly 102 includes the output mechanism 114a, the output mechanism may be configured to attract attention to the product display system 100 as a whole. Additionally or alternatively, the output mechanism 114b may be configured to draw a consumer's attention directly to the one or more products 104 due to inclusion therein.

In embodiments of the product display system 100 wherein the product display assembly 102 and one or more products 104 include output mechanisms 114a, 114b, the output mechanisms may be the same or different. Further, in embodiments in which the product display assembly 102 holds more than one product 104, one or more of the products may respectively include the output mechanism 114b. For example, in one embodiment one of the products 104 may include the output mechanism 114b, whereas the other products may not include the output mechanism. In this regard, usage of a singular product 104 including the output mechanism 114b may be sufficient to gain consumer attention. However, in an alternative embodiment a plurality of the products 104 may include a respective output mechanism 114b. For example, in one embodiment each of the products 104 received in the product display assembly 102 may include a respective output mechanism 114. In one embodiment in which two or more of the products 104 include an output mechanism 114b, the output mechanisms may be the same. In another embodiment wherein two or more of the products 104 include an output mechanism 114b, two or more differing types of output mechanisms 114b may be employed.

In a further embodiment one or more products 104 may include two or more of the output mechanisms 114b and/or the product display assembly 102 may include two or more output mechanisms 114a. In these embodiments the output mechanisms 114a included in the product display assembly 102 may differ from one another and/or the output mechanisms 114b included in each product 104 may differ from one another.

Thereby, as described above, the same or differing perceptible effects 112a, 112b may be outputted by the output mechanisms 114a, 114b. For simplicity and brevity purposes, "output mechanism(s) 114" configured to output "perceptible effect(s) 112" are generally described below. As may be understood, unless otherwise specified, the term "output mechanism(s) 114" may refer to an output mechanism 114a at the product display assembly 102 or an output mechanism 114b at the one or more products 104, and the term "perceptible effect(s) 112" may refer to the perceptible effects 112a, 112b outputted by either such output mechanisms.

Regardless of the placement thereof, various embodiments of output mechanisms 114 may be employed. Examples of output mechanisms 114 include a light emitter configured to output light, a sound emitter configured to output sound, a display configured to output graphics and/or text, a smell emitter configured to output a smell, and an actuator configured to output motion.

In a preferred embodiment of the output mechanism 114 the light emitter may comprise a light emitting diode (LED), or multiple LEDs. In this regard, LEDs may define a relatively high light output to power usage ratio. Further, LEDs may define relatively small sizes such that the LED may be relatively easily received in the product 104 or the product display assembly 102. However, in other embodiments of the output mechanism 114 the light emitter may comprise an incandescent bulb, a compact fluorescent light (CFL), or any other embodiment of light emitter.

Embodiments of the output mechanism 114 comprising sound emitters may include one or more speakers (e.g., electroacoustic transducers), buzzers, electric bells, chimes, etc. Thereby, the audible output may include one or more of music, speech, buzzing, ringing, etc. In some embodiments of the output mechanism 114 the sound emitter may output information regarding the products 104.

Embodiments of the output mechanism 114 comprising smell emitters may be configured to output a smell via one of various mechanisms. For example, the smell emitter may be configured to release a pressurized scented fluid to the surrounding atmosphere via an electromechanical valve. By way of further example, a fan may blow air through or past a scented medium to deliver a scent to the surrounding atmosphere. In another embodiment the smell emitter may comprise a heater (e.g., a resistance heater) configured to heat a scented medium to vaporize or otherwise release the scent to the surrounding atmosphere. In one embodiment the scent may be configured to mimic a scent of the product 104 or an item within the product. In this regard, by way of example, the product 104 may comprise a packaged tobacco product, and the package, which may be substantially sealed, may otherwise prevent the scent associated with the tobacco product from entering the surrounding atmosphere. Thereby, the output mechanism 114 may instead output the scent of the tobacco, to provide consumers with a sense of the smell or flavor (e.g., menthol or vanilla) associated therewith.

Embodiments of the output mechanism 114 comprising a display configured to output graphics and/or text may include a liquid-crystal display (LCD), a cathode ray tube display (CRT), a light-emitting diode display (LED), an electroluminescent display (ELD), electronic paper, electronic ink or photonic ink (e.g., electronic ink configured to display two or more colors), a plasma display panel (PDP), a liquid crystal display (LCD), a high-performance addressing display (HPA), a thin-film transistor display (TFT), an organic light-emitting diode display (OLED), a surface-conduction electron-emitter display (SED), a laser television, a carbon nanotube display, a quantum dot display, or an interferometric modulator display (IMOD), or similar materials and constructs or combinations thereof. Regardless of the particular embodiment of the display employed, the display may output one or more of a graphic, a text, a character, an animation, and a video. Video and animation may be employed to attract consumer attention due to the perceived motion associated therewith. Further, the display may be configured to output a single color, or multiple colors. As may be understood, outputting multiple colors may further attract consumer attention.

Example embodiments of electronic ink are commercially available from Opalux, Inc. of Toronto, Canada. Such electronic ink may employ photonic crystals made out of silica beads embedded in a resilient electroactive polymer and sandwiched between transparent electrodes. When a voltage is applied, an electrolyte fluid is drawn into the polymer composite, causing the polymer composite to swell, which alters the spacing of the photonic crystals, affecting which wavelengths of light the photonic crystals reflect. Thereby, the reflected light may form graphics and/or text in one or more colors.

Embodiments of the output mechanism 114 comprising actuators configured to output motion may include solenoids, electric motors (e.g., rotary or linear), and vibratory mechanisms (e.g., comprising a rotary motor and an eccentric mass). Accordingly, the actuator may cause physical motion of the product 104, the display assembly 102, or a portion of one or both. Physical motion may be employed for the same reason animation and video may be employed in a display, as described above. In this regard, motion may be readily noticed and perceived by a consumer.

In order to output the perceptible effect 112, each output mechanism 114 may require electricity to operate. In this regard, as illustrated in FIG. 1, in some embodiments the product display assembly 102 may further comprise a power supply 116. The power supply 116 may be configured to output an electrical current 118 to the one or more output mechanisms 114.

As illustrated in FIG. 1, in some embodiments, the power supply 116 may be configured to directly supply the electrical current 118 to the output mechanisms 114. In this regard, the power conversion mechanism 116 may be hard-wired or otherwise physically connected to the output mechanisms 114 such that the output mechanisms receive the electrical current 118 produced by the power supply 116.

By way of example, the power supply 116 may be configured to directly supply the electrical current 118 to the output mechanisms 114 in embodiments of the product display system 100 in which the output mechanism 114a is coupled to the product display assembly 102 and configured to remain attached thereto.

Further, in some embodiments the power supply 116 may be configured to directly supply the electrical current 118 to output mechanisms 114b of the products 104. For example, one or more products 104 including the output mechanism 114b may be substantially permanently engaged with the product display assembly 102. By way of further example, the products 104 including the output mechanism 114b may be secured to the rack 106 (see, FIG. 2) or other portion of the product display assembly 102, whereas the products configured for sale may be removable therefrom. In this embodiment the one or more products 104 including the output mechanism 114b may define an appearance that is substantially similar to the remaining products included in the product display assembly 102 and configured for sale, but the products may not include the items (e.g., cigarettes, smokeless tobacco, etc.) contained in the products configured for sale. In this regard, in one embodiment the products 104 including the output mechanism 114b may mimic the appearance of the products configured for sale, without actually including the items normally contained therein.

In one embodiment the power supply 116 may comprise an electrical cord configured to plug into an electrical wall outlet. In embodiments in which the output mechanisms 114 are powered by direct current (DC), the power supply 116 may further comprise an alternating current (AC) to direct current power inverter. Accordingly, in embodiments in which the power supply 116 comprises an electrical cord configured to receive power, the product display must be positioned proximate an electrical wall outlet.

However, in other embodiments it may be desirable to power the product display system 100 without an electrical cord connected to an electrical outlet. In this regard, electrical outlets may not be readily available in retail establishments at locations at which the product display system 100 may be positioned. Accordingly, in another embodiment the power supply 116 may comprise a battery. The battery may be replaceable, rechargeable, or configured to last a lifetime of the product display system 100.

Further, in an alternative embodiment, the power supply 116 may be configured to employ energy harvesting to produce the electrical current 118. In this embodiment the power supply 116 may be configured to receive and convert ambient energy into the electrical current 118. The ambient energy may come from electric or magnetic fields or radio waves from nearby electrical equipment, light, thermal energy (e.g., heat), or kinetic energy such as vibration or motion.

In this regard, by way of example, FIG. 3 illustrates a product display system 200 according to an example embodiment of the present disclosure. As illustrated, the product display system 200 may include the product display assembly 102 and the one or more products 104. Although only the product 104 is illustrated as including an output mechanism 114b, the product display assembly 102 may additionally include an output mechanism 114a (see, FIG. 1) in other embodiments.

As illustrated in FIG. 3, in one embodiment the power supply 116 may comprise a light-to-power conversion mechanism 120. The light-to-power conversion mechanism 120 may be configured to receive light 122 from a light source 124 and output the electrical current 118, which is hereinafter referred to as the "first electrical current." Thus, the light-to-power conversion mechanism 120 may comprise a photovoltaic cell.

For example, in some embodiments the light-to-power conversion mechanism 120 may comprise an amorphous silicon solar cell (a-Si), a biohybrid solar cell, a buried contact solar cell, a cadmium telluride solar cell (CdTe), a concentrated photovoltaic cell (CVP and HCVP), a copper indium gallium selenide solar cell (CI(G)S), a crystalline silicon solar cell (c-Si), a dye-sensitized solar cell (DSSC), a gallium arsenide germanium solar cell (GaAs), a hybrid solar cell, a luminescent solar concentrator cell (LSC), a micromorph solar cell (tandem-cell using a-Si/μc-Si), a monocrystalline solar cell (mono-Si), a multijunction solar cell (MJ), a nanocrystal solar cell, an organic solar cell (OPV), a perovskite solar cell, a photoelectrochemical cell (PEC), a plasmonic solar cell, a plastic solar cell, a polycrystalline solar cell (multi-Si), a polymer solar cell, a quantum dot solar cell, a solid-state solar cell, a thin film solar cell (TFSC), a wafer solar cell, or a wafer-based solar cell (crystalline silicon solar cell). However, the light-to-power conversion mechanism 120 may comprise various other embodiments of solar cells in other embodiments. Note that the term solar cell is used interchangeably herein with the terms photovoltaic cell and photoelectric cell, each of which refers to a solid state electrical device that converts energy from light into electricity (e.g., via the photovoltaic effect).

In some embodiments the light-to-power conversion mechanism 120 and the remainder of the product display system 100 may be located indoors. In this regard, many retail establishments are at least partially enclosed within buildings. Accordingly, the light-to-power conversion mechanism 120 may be configured to operate in low-light conditions that may exist in such indoor locations. For example, in some embodiments the light source 124 may comprise one or more incandescent light bulbs, compact florescent bulbs, light emitting diodes (LEDs), or any other electrically-powered light source configured to illuminate the retail establishment. However, as may be understood, the light 122 received by the light-to-power conversion mechanism 120 may additionally or alternatively be provided by ambient sunlight, which may enter the retail establishment through one or more windows, skylights, or openings. Examples of photovoltaic cells configured for operation in low-light conditions are commercially available from ElectricFilm, LLC of Newburyport, Mass. Various other photovoltaic cells are commercially available from SolarWorld Americas of Hillsboro, Oreg.

In other embodiments the light-to-power conversion mechanism 120 (and/or some or all of the other components of the product display system 100) may be located outdoors and configured for direct exposure to sunlight. In this embodiment the light-to-power conversion mechanism 120 may define a reduced size as compared to embodiments of light-to-power conversion mechanisms configured to produce power from indoor light. Alternatively or additionally the light-to-power conversion mechanism 120 may employ materials that are relatively less efficient, which may reduce the cost of the light-to-power conversion mechanism.

As illustrated in FIG. 3, in one embodiment the light-to-power conversion mechanism 120 may be positioned at the top of the product display assembly 102. Thereby, a primary surface 120' (see, FIG. 2) of the light-to-power conversion mechanism 120 configured to receive light 122 may be positioned substantially perpendicular to the light source 124 (e.g., one or more ceiling lights) and relatively close to the light source, such that the electricity production efficiency of the light-to-power mechanism is maximized. Further, as a result of being placed at or proximate the top of the product display assembly 102, the light-to-power conversion mechanism 120, which may be relatively fragile and/or expensive, may be positioned out of reach and/or out of view of consumers such that damage to the light-to-power conversion mechanism and/or theft of the light-to-power conversion mechanism may be less likely to occur.

As noted above with respect to the embodiment of the product display assembly illustrated in FIG. 1, in some embodiments the output mechanisms 114 may be hardwired to the power supply 116 or otherwise physically connected thereto to receive the first electrical current 118. However, in other embodiments the output mechanisms 114 may be indirectly powered by the power supply 116. In this regard, in some embodiments the one or more products 104 including the output mechanism 114b may be configured for sale. Thus, the one or more products 104 including the output mechanism 114b may each include the items normally contained therein (e.g., cigarettes, smokeless tobacco, etc.).

Accordingly, it may be desirable to allow for removal of the products 104 from the product display assembly 102 without requiring decoupling of a physical electrical connection between the product and the power supply 116. In this regard, in some embodiments it may be desirable to wirelessly provide power to the output mechanisms 114b of the products 104. Note that while usage of wireless power transmission is discussed below in terms of usage with the output mechanisms 114b at the products 104, in other embodiments wireless power transmission may be additionally or alternatively employed to supply power to output mechanisms 114a (see, FIG. 1) at the product display assembly 102.

In order to wirelessly provide power, in some embodiments the power supply 116 may include a wireless power transmitter 126 and the product 104 may include a wireless power receiver 128. The wireless power transmitter 126 may be configured to receive the first electrical current 118. As discussed below in detail, the wireless power transmitter 126 may cooperate with the wireless power receiver 128 to produce a second electrical current 130. Thereby, the output mechanism 114 may be configured to receive the second electrical current 130 from the wireless power receiver 128 to output the perceptible effect 112 in response thereto.

In this regard, the wireless power transmitter 126 and the wireless power receiver 128 may cooperate to wirelessly produce the second electrical current 130. Note that the term wireless, as used herein with respect to wireless power transmission, refers to an arrangement in which the wireless power receiver 128 produces and outputs the second electrical current 130 in cooperation with the wireless power transmitter 126, without receiving the second electrical current via a physical contact-based mechanism. In other words, electrical current is not directly transferred from the wireless power transmitter 126 to the wireless power receiver 128 via a wire or other solid-state circuit, such that physical contact between the wireless power transmitter and the wireless power receiver is not required. Rather, the wireless power transmitter 126 employs the first electrical current 118 to indirectly cause the wireless power receiver 128 to produce the second electrical current 130. Thereby, as a result of no direct, physical electrical connection being formed between the wireless power transmitter 126 and the wireless power receiver 128, the second electrical current 130 may differ in one or more respects (e.g., voltage or current) as compared to the first electrical current 118.

The configuration of the wireless power transmitter 126 and the wireless power receiver 128, as well as the mechanisms employed thereby, may differ. In one embodiment the wireless power transmitter 126 and the wireless power receiver 128 may employ induction to output the second electrical current 130. In this regard, the wireless power transmitter 126 may include a first coil and the wireless power receiver 128 may include a second coil. The two induction coils in proximity combine to form an electrical transformer. A change in current in the first coil of the wireless power transmitter 126, as provided by the first electrical current 118, produces an alternating electromagnetic field that induces a voltage across the ends of the second coil of the wireless power receiver 128. Thereby, the induced voltage is outputted from the wireless power receiver 128 as the second electrical current 130. In some embodiments resonant inductive coupling may be employed to improve the allowed range between the wireless power transmitter 126 and the wireless power receiver 128.

In another embodiment the wireless power transmitter 126 and the wireless power receiver 128 may employ capacitive coupling to produce the second electrical current 130. In capacitive coupling, which may also be referred to as electrostatic induction, power is transmitted by electric fields between electrodes such as metal plates included at the wireless power transmitter 126 and the wireless power receiver 128. The transmitter and receiver electrodes form a capacitor, with the intervening space serving as the dielectric. Thereby, when the first electrical current 118 is provided to the plate at the wireless power transmitter 126 as an alternating current (e.g., by employing a direct current to alternative current inverter between the light-to-power conversion mechanism 120 and the wireless power transmitter), the oscillating electric field induces an alternating potential on the plate at the wireless power receiver 128 by electrostatic induction. Thereby, the alternating current provided at the wireless power receiver 128 forms the second electrical current 130, which may be converted to a direct current via usage of an inverter.

In another embodiment the wireless power transmitter 126 and the wireless power receiver 128 may employ magnetodynamic coupling to produce the second electrical current 130. In this embodiment, power is transmitted between two rotating armatures, one in the wireless power transmitter 126 and one in the wireless power receiver 128, which rotate synchronously during power transmission therebetween. The armatures are coupled together by a magnetic field generated by permanent magnets on the armatures. The transmitter armature is turned either by, or as, the rotor of an electric motor powered by the first electrical current 118, and its magnetic field exerts torque on the receiver armature, thereby turning it. Thus, the magnetic field acts like a mechanical coupling between the armatures, without requiring a physical connection therebetween. The receiver armature at the wireless power receiver 128 produces the second electric current 130, either by turning a separate electric generator, or by using the receiver armature itself as the rotor in a generator.

In the above-described embodiments a coupling mechanism 132 between the wireless power transmitter 126 and the wireless power receiver 128 is employed to produce the second electrical current 130. As described above, the coupling mechanism 132 may comprise, for example, an inductive coupling mechanism, a capacitive coupling mechanism, or a magnetodynamic coupling mechanism. These coupling mechanisms 132 may be referred to as near-field wireless power transmission mechanisms. Usage of such near-field wireless power transmission mechanisms may be preferable in some embodiments due to the product display system 200 preferably defining relatively short distances between the wireless power transmitter 126 and the wireless power receiver 128 of the present disclosure.

However, in other embodiments far-field power transmission mechanisms may be employed. For example far-field energy transmission techniques may include microwave power transmission and laser power transmission. Although these techniques may be employed to transmit electrical power wirelessly, such techniques may require usage of specialized antennas and other mechanisms which may undesirably increase the cost and/or size of the product display system 200. Further, as noted above, the distance between the wireless power transmitter 126 and the wireless power receiver 128 may be relatively short (e.g., less than one meter, and preferably less than ten centimeters). Thus, usage of far-field power transmission mechanisms and techniques may not be necessary. Accordingly, in some embodiments usage of near-field power transmission mechanisms and techniques may be preferable over far-field power transmission mechanisms and techniques.

Regardless of the particular power transmission mechanism and technique employed, the wireless power receiver 128 may output the second electrical current 130 when the first electrical current 118 is directed to the wireless power transmitter 126. In some embodiments the wireless power transmitter 126 may receive the first electrical current 118 directly from the light-to-power conversion mechanism 120 such that the wireless power transmitter 126 operates substantially continuously when the first electrical current is sufficient for operation of the wireless power transmitter. However, in some instances the first electrical current 118 produced by the light-to-power conversion mechanism 120 may be insufficient to allow for continuous cooperative operation of the wireless power transmitter 126 and the wireless power receiver 128 to produce the second electrical current 130 sufficient for operation of the output mechanism 114. Further, in some embodiments it may be preferable to discontinuously operate the output mechanism 114, such that the perceptible effect 112 which is employed to attract consumer attention is outputted discontinuously. In this regard, dynamic output of the perceptible effect 112 may more successfully gain consumer attention due to changing stimuli being more easily perceptible.

Accordingly, the product display system 100 may further comprise certain mechanisms described below that allow for operation of the output mechanism 114 and output of the perceptible effect 112 in a controlled (e.g., discontinuous) manner. In some embodiments the product 104 may include such mechanisms that control the output of the perceptible effect 112 or otherwise provide for discontinuous operation of the output mechanism 114. However, as noted above, the product 104 may be configured for sale, and such mechanisms may provide no useful purpose post-sale to a consumer. Further, such mechanisms may be operable with a plurality of output mechanisms 114, such that inclusion in each of the products 104 may not be necessary. Accordingly, it may be desirable to locate as much of the components of the product display system 100 as possible in the product display assembly 102, rather than in the product 104. Thereby, the total costs associated with the product display system 100 may be reduced, and relatively fewer components may be included in the products 104 so as to reduce the costs and size of the products.

In this regard, in some embodiments the product display assembly 102 may further comprise a control circuit 134. The control circuit 134 may be configured to control output of the first electrical current 118 to the wireless power transmitter 126. For example, the control circuit 134 may be configured to direct the first electrical current 118 to the wireless power transmitter 126 at one or more predetermined intervals or at one or more predetermined times of the day, which may be within typical retail establishment hours. Further, the control circuit 134 may control a duration of time during which the first electrical current 118 is directed to the wireless power transmitter 126 in each instance in which the control circuit directs the first electrical current to the wireless power transmitter. Thereby, the timing and duration of time that the wireless power receiver 128 outputs the second electrical current 130 may be indirectly controlled.

The control circuit 134 may control the output of the first electrical current 118 to the wireless power transmitter 126 in additional or alternative manners. In this regard, in some embodiments the control circuit 134 may comprise a sensor 136. The sensor 136 may be configured to detect a human presence. For example, the sensor 136 may comprise a proximity sensor configured to detect proximity of a human, a motion sensor configured to detect motion, or a sound sensor configured to detect sound. The output mechanism 114 may be configured to activate in response to detection of the human presence by the sensor 136 to output the perceptible effect 112 in one or more manners, as described by way of example above.

In some embodiments the sensor 136 may comprise a passive infrared sensor (PIR). Passive infrared sensors are configured to detect a person's skin temperature through emitted black body radiation at mid-infrared wavelengths, in contrast to background objects at room temperature. In another embodiment the sensor 136 may comprise an emitter configured to emit a beam of light and a detector configured to detect the beam of light. The emitter and the detector may be positioned such that a person walking in proximity to the product display assembly 102 interrupts the beam of light, and thereby the person's presence is detected.

In an additional embodiment the sensor 136 may comprise a microwave sensor or an ultrasonic sensor. Microwave sensors and ultrasonic sensors may detect motion using the principle of the Doppler Effect by emitting a microwave or an ultrasonic wave and detecting a reflected signal with a receiver. In a further embodiment the sensor 136 may comprise a tomographic motion detector. Tomographic motion detectors detect disturbances to radio waves as they pass from node to node of a mesh network, such that movement may be detected across a specified area. In a further embodiment the sensor 136 may comprise an image sensor such as a video camera. The control circuit 134 may thereby include software configured to analyze the images captured by the image sensor to detect movement. In another embodiment the sensor 136 may comprise a vibration sensor configured to detect vibrations (e.g., associated with footsteps or shopping cart movement) or a microphone configured to detect sound associated with a nearby customer.

In some of the above embodiments the sensor 136 may be configured to detect motion, and a direction thereof. For example, microwave and ultrasonic sensors may detect phase shifts in the reflected signal which may be employed by the control circuit 134 to determine whether the motion is toward or away from the receiver. Similarly, image sensors may detect a direction of movement based on the change of position and/or size of objects within the frame of view.

In this regard, in some embodiments the control circuit 134 may be configured to control the output of the first electrical current 118 to the wireless power transmitter 126 and/or otherwise control the operation of the output mechanism 114 based on the direction of the detected movement (e.g., toward, or away from, the product display assembly 102). Thereby, for example, in some embodiments the control circuit 134 may be configured to direct the first electrical current 118 to the wireless power transmitter 126 in instances in which motion toward the sensor 136 (and thereby toward the product display assembly 102 as a whole) is detected, but not when motion away from the sensor is detected. This control scheme may be employed, by way of example, in embodiments in which the output mechanism 114 is configured to output a perceptible effect 112 that is visible. For example, such control schemes may be employed when the perceptible effect comprises graphics, light, and/or physical motion. Thus, energy may not be wasted on visual perceptible effects 112 configured to gain a consumer's attention when the person is likely facing an opposing direction.

Conversely, in some embodiments the control circuit 134 may be configured to direct the first electrical current 118 to the wireless power transmitter 126 in instances in which motion away from the sensor 136 is detected (and thereby away from the product display assembly 102 as a whole), but not when motion toward the sensor is detected. This control scheme may be employed, by way of example, in embodiments in which the output mechanism 114 is configured to output a perceptible effect 112 that is audible. Thereby, for example, an audible perceptible effect 112 may be emitted when a person is walking away from the sensor 136 in an attempt to draw a person back toward the product display assembly 102, but energy may not be wasted on an audible perceptible effect when a person is already moving toward the product display assembly. In another embodiment the tone, volume, type, or other characteristic of the audible perceptible effect 112 produced by the output mechanism 114 may be controlled based one whether the person is moving toward or away from the sensor 136. In this regard, by changing the perceptible effect 112 in response to the movement of the consumer, the product display assembly 102 may be more likely to attract the consumer's attention and interest.

Further, the control circuit 134 may be configured to direct operation of the output mechanism 114 according to various combinations of the above-described control schemes. For example, the control circuit 134 may be configured to cause the output mechanism 114 to output an audible perceptible effect when the sensor 136 detects movement away therefrom and cause the output mechanism to output a visual perceptible effect 112 when movement toward the sensor is detected. In this regard, while visual perceptible effects 112 may be most noticeable when walking toward the product display assembly 102, audible perceptible effects may be perceptible even when walking away from the product display assembly.

Accordingly, regardless of whether or not the sensor 136 is employed, and regardless of the type of the sensor, the control circuit 134 may direct the first electrical current 118 to the wireless power transmitter 126 under one or more circumstances. In order to facilitate controlled output of the first electrical current 118 to the wireless power transmitter 126, in some embodiments the product display assembly 102 may further comprise a current storage mechanism 138. The current storage mechanism 138 may be configured to store the first electrical current 118. In this regard, in some embodiments the current storage mechanism 138 may comprise a battery (e.g., a rechargeable battery) or a capacitor (e.g., a supercapacitor). Thereby, the current storage mechanism 138 may output the first electrical current 118 to the wireless power transmitter 126 when directed to do so by the control circuit 134. Thus, for example, the first electrical current 118 may be directed from the current storage mechanism 138 to the wireless power transmitter 126 by the control circuit 134 in response to detection of a human presence by the sensor 136, or once a threshold voltage or current is reached at the current storage mechanism.

Regardless of the particular power transmission mechanism and technique employed, the wireless power receiver 128 may output the second electrical current 130. The output mechanism 114 may be configured to receive the second electrical current 130 from the wireless power receiver 128 and output the perceptible effect 112 in response thereto. Accordingly, wireless power transmission may be employed to produce and output a perceptible effect 112.

FIG. 4 illustrates an additional example embodiment of a product display system 300. As illustrated, the product display system 300 may include the product display assembly 102 and the product 104. The product 104 may include the output mechanism 114b configured to output the perceptible effect 112b.

However, the product display system 300 may differ from the embodiments of the product display systems 100, 200 described above in that the product 104 may further comprise the power supply 116. In this embodiment the power supply 116 may comprise a current storage mechanism, which may be substantially similar to the current storage mechanism 138 described above. Thereby, for example, the output mechanism 114b may output the perceptible effect 112b (e.g., at predefined intervals) until the current stored in the power supply 116 is depleted.

Alternatively, the power supply 116 illustrated in FIG. 4 may be configured to employ energy harvesting to produce an electrical current 140 that powers the output mechanism 114b. In this embodiment the power supply 116 may be configured to receive and convert ambient energy into the electrical current 118. The ambient energy may come from electric or magnetic fields or radio waves from nearby electrical equipment, light, thermal energy (e.g., heat), or kinetic energy such as vibration or motion. Thus, by way of example, the power supply 116 may comprise the above-described light-to-power conversion mechanism 120. This embodiment of the product display system 300 may provide advantages similar to those provided by the product display system 200 of FIG. 3 in that the product 104 may output the perceptible effect 112b without requiring a physical electrical connection to the product display assembly 102. However, usage of energy harvesting mechanisms at the product 104 may cause the product to be prohibitively expensive and/or increase the size of the product beyond a desired size. Accordingly, usage of the wireless power transmission mechanisms included in the product display system 200 of FIG. 3 may be preferable as compared to the power harvesting mechanisms included in the product display system 300 of FIG. 4.

Note that although the control circuit 134, the sensor 136, and current storage mechanism 138 are generally described above in relation to the embodiment of the product display system 200 of FIG. 3, one or more of these components may be employed in the other embodiments of product display systems 100, 300 provided herein, and such mechanisms may be employed in one or both of the product display assembly 102 and the product 104. In this regard, output of the perceptible effects 112 by the output mechanisms 114 may occur in a controlled manner in any of the embodiments of the product display systems 100, 200, 300 provided herein. Note further that although wireless power transmission is generally described above in conjunction with usage of a power supply 116 comprising a light-to-power conversion mechanism 120, wireless power transmission may be employed without usage of the light-to-power conversion mechanism and vice versa.

FIG. 5 illustrates an example embodiment of the product 104, wherein the product comprises a packaged tobacco product. In particular, in the embodiment of the product 104 illustrated in FIG. 5, the product comprises a pack of cigarettes. However, the product may comprise various other packaged tobacco products in other embodiments, such as smokeless tobacco products and aerosol delivery devices (e.g., electronic cigarettes), and the related packaging (e.g., tins, pucks, containers, boxes, bubble packaging, etc.). Accordingly, it should be understood that the product 104 illustrated in FIG. 5 is provided for example purposes only.

As illustrated in FIG. 5, the product 104 may include a package 140. The package 140 may include an outer body 142. In one embodiment the product 104 may comprise a logo 144, which may be printed on the outer body 142. As noted above, in some embodiments the product 104 may include the output mechanism 114b. In this regard, as further illustrated in FIG. 5, in one embodiment the output mechanism 114b may be positioned at the logo 144.

The output mechanism 114b may be integrated into the design of the logo 144. For example, as illustrated, the output mechanism 114b may be positioned at an eye portion of the logo 144. Thereby, in embodiments in which the output mechanism 114b is configured to output light, the logo 144 may appear to wink or glow, to thereby draw a consumer's attention to the product 104 as a whole and to the logo, to thereby promote interest in the brand associated therewith.

Regardless of the type of output mechanism 114b employed and whether or not the output mechanism is positioned at the logo 144, the output mechanism may be coupled to (e.g., embedded in or positioned inside) the package 140. In this regard, FIG. 6 illustrates an exploded, partial cutaway view of the product 104 in an embodiment in which the product comprises a packaged tobacco product. As illustrated, the product 104 may include the package 140 and a plurality of smoking articles 146 received within an inner wrapper 148. The package 140 may be configured to receive the smoking articles 146 and the inner wrapper 148 therein. Further, the package 140 may include the outer body 142 and an inner frame 150. Additional description regarding example embodiments of packages for smoking articles is provided in U.S. patent application Ser. No. 14/205,818 to Wood et al., filed Mar. 12, 2014, which is incorporated herein by reference in its entirety.

FIG. 7 schematically illustrates a partial sectional view through the package 140. As illustrated, in some embodiments the output mechanism 114b and/or the wireless power receiver 128 may be received between the outer body 142 and the inner frame 150. Thereby, the output mechanism 114b and/or the wireless power receiver 128 may be substantially or totally hidden from view. However, in embodiments in which the output mechanism 114b outputs a visible perceptible effect 112b, the output mechanism may be positioned such that at least a portion of the output mechanism 114b extends to an outer surface 142' of the outer body 142 (see, FIG. 6). Thereby the perceptible effect 112b may be visible to consumers. As further illustrated in FIG. 7, in some embodiments the package 140 may additionally include an outer wrapper 152, which may surround the outer body 142. However, the outer wrapper 152 may be translucent or transparent such that the perceptible effect 112b is visible therethrough.

A related product display method is also provided. As illustrated in FIG. 8, the method may include positioning a product in proximity to a product display assembly at operation 402. Further, the method may include outputting a first electrical current to a wireless power transmitter of the product display assembly at operation 404. The method may further include producing a second electrical current with a wireless power receiver of the product configured to cooperate with the wireless power transmitter at operation 406. Additionally, the method may include receiving the second electrical current and outputting a perceptible effect in response thereto with an output mechanism of the product at operation 408.

In some embodiments positioning the product in proximity to the product display assembly at operation 402 may comprise positioning a packaged tobacco product in the product display assembly. Further, outputting the perceptible effect at operation 402 may comprise outputting light. Outputting the light may comprise outputting light at a logo on the product.

In some embodiments outputting the perceptible effect at operation 410 may comprise displaying one or more of a text and a graphic. Displaying one or more of the text and the graphic may comprise displaying a plurality of colors. Further, displaying one or more of the text and the graphic may comprise displaying animation.

In some embodiments the method may further comprise detecting a human presence. Further, outputting the first electrical current to the wireless power transmitter at operation 404 may comprise directing the first electrical current to the wireless power transmitter in response to detection of the human presence. Detecting the human presence may include detecting one or more of a motion and a sound. The method may additionally include storing the first electrical current. Further, outputting the first electrical current to the wireless power transmitter at operation 404 may comprise directing the first electrical current to the wireless power transmitter in response to detection of the human presence by the sensor. Additionally, outputting the first electrical current to the wireless power transmitter of the product display assembly at operation 404 may include receiving light and outputting the first electrical current in response thereto with a light-to-power conversion mechanism of the product display assembly.

Many modifications and other aspects of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A product display system, comprising:
   a product display assembly comprising a power supply configured to produce a first electrical current, the power supply including a wireless power transmitter configured to receive the first electrical current; and a product positioned in proximity to the product display assembly, the product comprising:
a wireless power receiver configured to cooperate with the wireless power transmitter to produce a second electrical current; and
an output mechanism configured to receive the second electrical current from the wireless power receiver and output a perceptible effect in response thereto.

2. The product display system of claim 1, wherein the product is a packaged tobacco product.

3. The product display system of claim 1, wherein the output mechanism comprises a light emitter configured to output light.

4. The product display system of claim 3, wherein the product comprises a logo, and the light emitter is positioned at the logo.

5. The product display system of claim 1, wherein the output mechanism comprises an electronic ink configured to display one or more of a text and a graphic.

6. The product display system of claim 5, wherein the electronic ink is configured to display a plurality of colors.

7. The product display system of claim 5, wherein the electronic ink is configured to display animation.

8. The product display system of claim 1, further comprising a sensor configured to detect a human presence, the output mechanism being configured to activate in response to detection of the human presence by the sensor.

9. The product display system of claim 8, wherein the sensor is configured to detect one or more of a motion and a sound.

10. The product display system of claim 8, further comprising a current storage mechanism configured to store the first electrical current and output the first electrical current to the wireless power transmitter in response to detection of the human presence by the sensor.

11. The product display system of claim 1, wherein the power supply comprises a light-to-power conversion mechanism configured to receive light and output the first electrical current.

12. A product display method, comprising:
positioning a product in proximity to a product display assembly;
outputting a first electrical current to a wireless power transmitter of the product display assembly;
producing a second electrical current with a wireless power receiver of the product configured to cooperate with the wireless power transmitter;
receiving the second electrical current and outputting a perceptible effect in response thereto with an output mechanism of the product.

13. The product display method of claim 12, wherein positioning the product in proximity to the product display assembly comprises positioning a packaged tobacco product in the product display assembly.

14. The product display method of claim 12, wherein outputting the perceptible effect comprises outputting light.

15. The product display method of claim 14, wherein outputting light comprises outputting light at a logo on the product.

16. The product display method of claim 12, wherein outputting the perceptible effect comprises displaying one or more of a text and a graphic.

17. The product display method of claim 16, wherein displaying one or more of the text and the graphic comprises displaying a plurality of colors.

18. The product display method of claim 16, wherein displaying one or more of the text and the graphic comprises displaying animation.

19. The product display method of claim 12, further comprising detecting a human presence,
wherein outputting the first electrical current to the wireless power transmitter comprises outputting the first electrical current to the wireless power transmitter in response to detection of the human presence.

20. The product display method of claim 19, wherein detecting the human presence comprises detecting one or more of a motion and a sound.

21. The product display method of claim 19, further comprising storing the first electrical current,
wherein outputting the first electrical current to the wireless power transmitter comprises outputting the first electrical current to the wireless power transmitter in response to detection of the human presence by the sensor.

22. The product display method of claim 12, wherein outputting the first electrical current to the wireless power transmitter of the product display assembly comprises receiving light and outputting the first electrical current in response thereto with a light-to-power conversion mechanism of the product display assembly.

23. A product display system, comprising:
a product display assembly comprising a power supply; and
a packaged tobacco product positioned in proximity to the product display assembly, the packaged tobacco product comprising an output mechanism powered by the power supply and configured to output a perceptible effect.

24. The product display system of claim 23, wherein the power supply comprises a wireless power transmitter, and
wherein the packaged tobacco product further comprises a wireless power receiver configured to cooperate with the wireless power transmitter to power the output mechanism.

25. The product display system of claim 23, wherein the product comprises a logo, and
wherein the output mechanism comprises a light emitter positioned at the logo and configured to output light.

26. The product display system of claim 23, wherein the power supply comprises a light-to-power conversion mechanism.

* * * * *